US008204185B1

(12) United States Patent
Koltenuk

(10) Patent No.: US 8,204,185 B1
(45) Date of Patent: Jun. 19, 2012

(54) METHOD AND APPARATUS FOR RETRIEVING VOICEMAIL MESSAGES VIA CUSTOMER PREMISE EQUIPMENT

(75) Inventor: Joyce Koltenuk, Flanders, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1059 days.

(21) Appl. No.: 11/413,262

(22) Filed: Apr. 28, 2006

(51) Int. Cl.
*H04M 1/64* (2006.01)

(52) U.S. Cl. ..................................... 379/88.23

(58) Field of Classification Search ............... 379/88.12, 379/88.26, 88.18, 88.22
See application file for complete search history.

(56) References Cited

U.S. PATENT DOCUMENTS

| | | | |
|---|---|---|---|
| 4,640,991 A | | 2/1987 | Matthews et al. |
| 4,757,525 A | | 7/1988 | Matthews et al. |
| 5,172,404 A | * | 12/1992 | Hashimoto ................ 379/88.18 |
| 5,568,540 A | | 10/1996 | Greco et al. |
| 5,822,405 A | * | 10/1998 | Astarabadi ................ 379/88.04 |
| 5,943,402 A | * | 8/1999 | Hamel et al. ............... 379/88.26 |
| 5,991,369 A | | 11/1999 | Petrunka et al. |
| 6,052,442 A | * | 4/2000 | Cooper et al. ............. 379/88.19 |
| 6,219,638 B1 | * | 4/2001 | Padmanabhan et al. ...... 704/235 |
| 6,341,160 B2 | * | 1/2002 | Tverskoy et al. .......... 379/88.13 |
| 6,385,306 B1 | * | 5/2002 | Baxter, Jr. .................. 379/88.13 |
| 6,526,128 B1 | * | 2/2003 | Kermani .................... 379/88.22 |
| 7,043,433 B2 | | 5/2006 | Hejna, Jr. |
| 7,379,421 B1 | * | 5/2008 | Gao et al. .................. 370/230.1 |
| 7,535,890 B2 | * | 5/2009 | Rojas .......................... 370/352 |
| 2003/0023689 A1 | * | 1/2003 | Brown et al. ............... 709/206 |
| 2003/0152207 A1 | | 8/2003 | Ryan |
| 2004/0252679 A1 | * | 12/2004 | Williams et al. ............. 370/356 |
| 2006/0029050 A1 | | 2/2006 | Harris et al. |
| 2006/0031340 A1 | | 2/2006 | Mathew et al. |

* cited by examiner

*Primary Examiner* — Davetta W Goins
*Assistant Examiner* — Mohammad Islam

(57) ABSTRACT

A method and apparatus for retrieving voicemail messages transmitted in packet networks such as Voice over Internet Protocol (VoIP) and Service over Internet Protocol (SoIP) networks are disclosed. In one embodiment, the customer subscribes to a voicemail service and enables a customer premise equipment to access the endpoint device used to receive email containing the audio files from the voicemail service. The customer equipment accesses the emails, retrieves the attached audio files for the voice messages and transfers the messages to a recording device with capability to play all the messages at the same time, e.g., in a continuous or consecutive manner as in an answering machine with a single user input.

10 Claims, 4 Drawing Sheets

METHOD AND APPARATUS FOR RETRIEVING VOICEMAIL MESSAGES VIA CUSTOMER PREMISE EQUIPMENT

The present invention relates generally to communication networks and, more particularly, to a method for retrieving voicemail messages transmitted in packet networks such as Voice over Internet Protocol (VoIP) and Service over Internet Protocol (SoIP) networks.

BACKGROUND OF THE INVENTION

The Internet has emerged as a critical communication infrastructure, carrying traffic for a wide range of important applications. Internet services such as VoIP and SoIP are becoming ubiquitous and more and more businesses and consumers are utilizing these networks to obtain services from any location with an Internet connection. For example, customers may combine their data and voice services on an Internet based infrastructure such as VoIP and reduce the cost associated with multiple communications infrastructures. When customers subscribe to a voicemail service on a VoIP or SoIP platform, the network service provider creates and sends email messages containing audio files to the customer. If a customer receives multiple voicemail messages, the customer listens to each audio clip one by one. For example, a customer clicks on an email containing an audio file, then clicks and listens to the audio file until it is finished, then clicks on another email, and so on. However, the customers are used to being able to multitask while listening to voicemail messages stored on answering machines, i.e., the customer may wish to perform other tasks while listening to voicemail messages.

Therefore there is a need for a method and apparatus that enables a customer to retrieve and listen to voicemail messages at the same time.

SUMMARY OF THE INVENTION

In one embodiment, the present invention discloses a method and apparatus for retrieving voicemail messages transmitted in packet networks such as Voice over Internet Protocol (VoIP) and Service over Internet Protocol (SoIP) networks. For example, the customer subscribes to a voicemail service and enables a customer premise equipment to access an endpoint device used to receive emails that contain audio files from the voicemail service. The customer premise equipment accesses the emails and retrieves the attached audio files. The method also enables the audio files to be transferred or forwarded to a recording device with capability to play all the messages at the same time, e.g., in a continuous or consecutive manner as in an answering machine with a single user input.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for retrieving voicemail messages transmitted on networks such as VoIP or SoIP networks using customer premise equipment. Although the present invention is discussed below in the context of calls in VoIP and SoIP networks, the present invention is not so limited. Namely, the present invention can be applied for other networks such as a cellular network.

Figure 1:
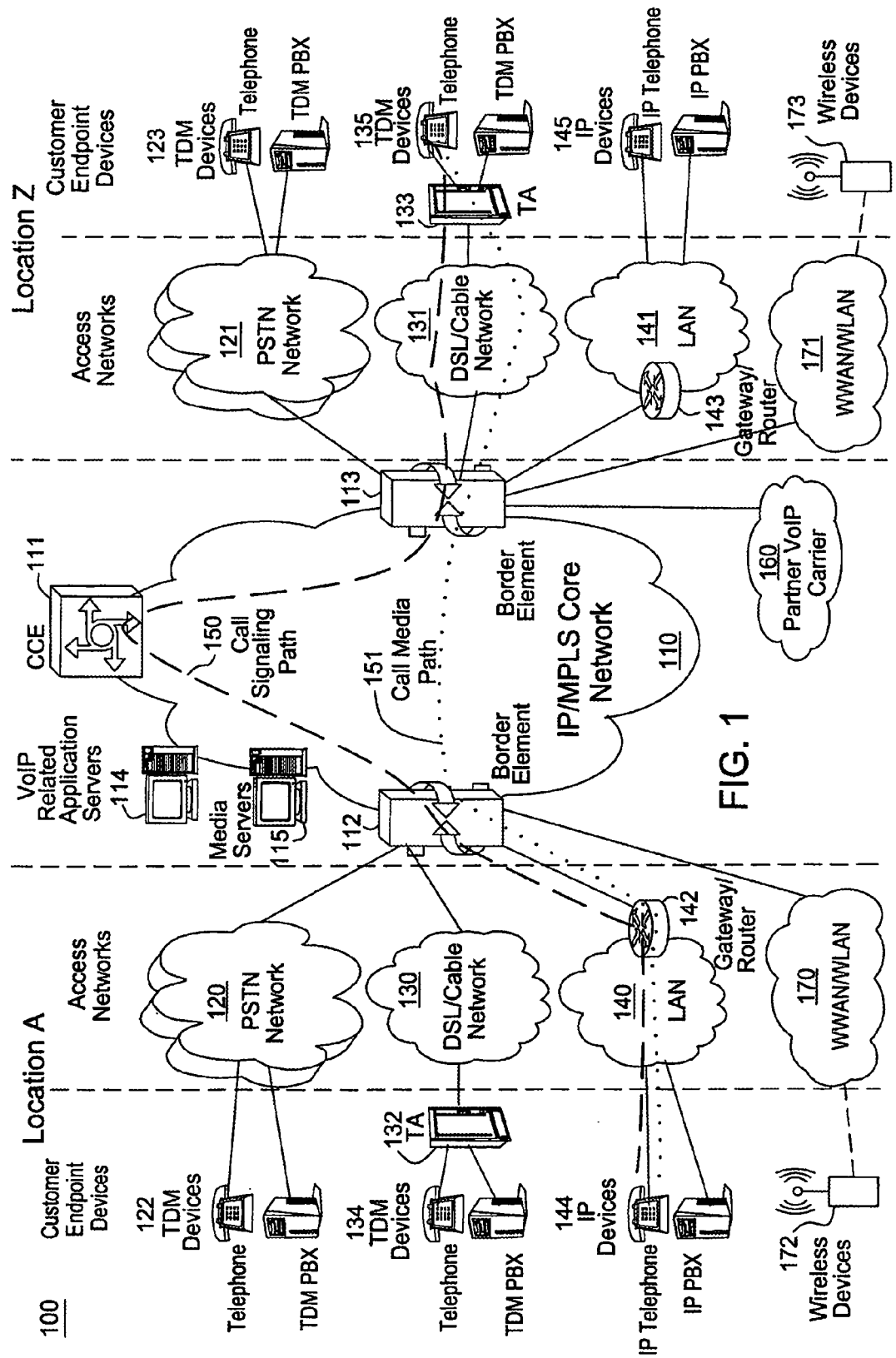
FIG. 1 illustrates an exemplary network related to the present invention.

To better understand the present invention, FIG. 1 illustrates an example network 100, e.g., a packet network such as a VoIP network related to the present invention. Exemplary packet networks include Internet protocol (IP) networks, Asynchronous Transfer Mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted as limited by this particular illustrative architecture.

The customer endpoint devices can be either Time Division Multiplexing (TDM) based, IP based or wireless such as cellular phones. TDM based customer endpoint devices 122, 123, 134, and 135 typically comprise of TDM phones or Private Branch Exchange (PBX). IP based customer endpoint devices 144 and 145 typically comprise IP phones or IP PBX. Wireless endpoint devices 172 and 173, typically comprise cellular phones, pocket PCs etc. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 which has a VoIP gateway router 142 or 143, as shown in FIG. 1. Wireless endpoint devices access VoIP services by using Wireless Local Area Networks (WLAN) or Wireless Wide Area Networks (WWAN) 170 and 171. The WLAN/WWAN networks 170 and 171 are connected to the IP core network 110 through the border elements 112 and 113, respectively.

The access networks for wired devices can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices. The access network for wireless devices 170 and 171 can be WLAN, WWAN or an integrated WLAN/WWAN network.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that requires certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

Media Servers (MS) 115 are special servers that typically handle and terminate media streams, and to provide services such as announcements, bridges, transcoding, and Interactive Voice Response (IVR) messages for VoIP service applications. The media servers also interact with customers for media session management to accomplish tasks such as process requests.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

The above network is described to provide an illustrative environment in which services are provided on networks such as VoIP and SoIP networks. Internet services such as VoIP and SoIP are becoming ubiquitous and more and more businesses and consumers are utilizing these networks to obtain communications services from any location on a combined infrastructure. For example, customers may combine their data and voice services on a network such as a VoIP or a SoIP network. When customers subscribe to a voicemail service on a VoIP or SoIP platform, the network service provider creates and sends email messages containing audio files to the customer. The customer may access the emails via an endpoint device such as a computer. If the customer receives multiple voicemail messages, then the customer will receive multiple email messages. In turn, the customer opens each email and listens to each audio clip one at a time. For example, a customer clicks on an email containing an audio file, then clicks and listens to the audio file contained in the email, opens another email, listens to the audio file contained in that email, and so on.

However, the customers are used to being able to multitask while listening to messages. For example, answering machines used in traditional time division multiplexed networks are attached directly to the telephone line. When the telephone rings, if the customer doesn't pickup the telephone, the answering machine interacts with the calling party and records messages left by the caller. The answering machine is located at the customer premise and is operated by the customer. Once the customer begins playing the messages, most answering machines continue to play the messages in a continuous or consecutive manner until all messages are played without requiring further action from the customer. Thus, a customer who needs to perform other tasks while listening to voicemail messages would find that voicemail services provided on a VoIP or SoIP network to be inconvenient. Therefore, there is a need for a method and apparatus that enables a customer to retrieve and listen to voicemail messages at the same time, e.g., in a continuous or consecutive manner via a single user input that is received for listening to a plurality of voicemail messages.

The current invention enables the customer to retrieve messages at the same time by retrieving the various audio files from the voicemail service and making the audio messages available in a piece of equipment with capability to play messages at the same time. In order to clearly illustrate the teachings of the current invention, the following networking terminologies will first be described:

A home network;
A router;
A cable modem; and
A DSL modem

A home network is a network of computers, IP devices, printers, and the like interconnected to one another in a home or small office environment. The interconnection can utilize a variety of technologies such as wireless communication, Ethernet based communication, telephone lines, etc. and can be for various reasons such as sharing of printers or an Internet connection. If the Internet connection is shared among several endpoint devices such as computers, a router can be used to handle the connection sharing.

A router is a networking device that is used to forward packets towards their destination using a Layer-3 networking protocol such as IP. In the home networking environment, it can be used to handle the sharing of an Internet connection. Thus, the router has address translation capability to allow multiple computers to access the Internet using a single public IP address. The router in this environment may contain a firewall, an Ethernet hub and wireless hub functions. Furthermore, if analog phones are to be used to access VoIP services, the router may also include RJ-11 ports for connecting with the TA. Hence, the router has a variety of ports such as Ethernet ports, RJ-11 ports, wireless ports and the like to enable sharing the network connection and a port for connecting to either a DSL or Cable broadband network.

A cable modem is a device used to access the information contained on channels transmitted on a coaxial cable. A cable modem contains at least a tuner for selection of frequencies, a demodulator for converting the radio frequency signals to signals that vary with voltage, an analog to digital converter, a Media Access Control (MAC) and a processor. If it is used for Internet access, then it also contains a digital to analog converter and a modulator. When a home network is connected to the cable network through the router, different channels are used for the CATV and Internet services such as VoIP. The cable modem separates the channels for the Internet services and the CATV. The packets on the channels for Internet services are forwarded to the router. It should be noted that if only one computer is connected to the Internet, the computer can be directly connected to the cable modem without the router.

A Digital Subscriber Line (DSL) modem is a device with modulation scheme used to connect data devices such as a computer for transporting packets on the telephone network. DSL uses existing phone lines to connect to the Internet.

The broadband service can be provided on DSL or cable. As discussed above, the appropriate modems are utilized based on the type of broadband access provided to the customer. The service provider may install a network interface device to connect the wiring used for the home network to either the telephone or coaxial cable network. A voicemail service on a VoIP network may allow an endpoint device such as a computer, to access the email messages containing the audio files. The present invention enables the audio files to be provided on a device with capability to play all the messages at the same time, e.g., in a continuous or consecutive manner.

Figure 2:
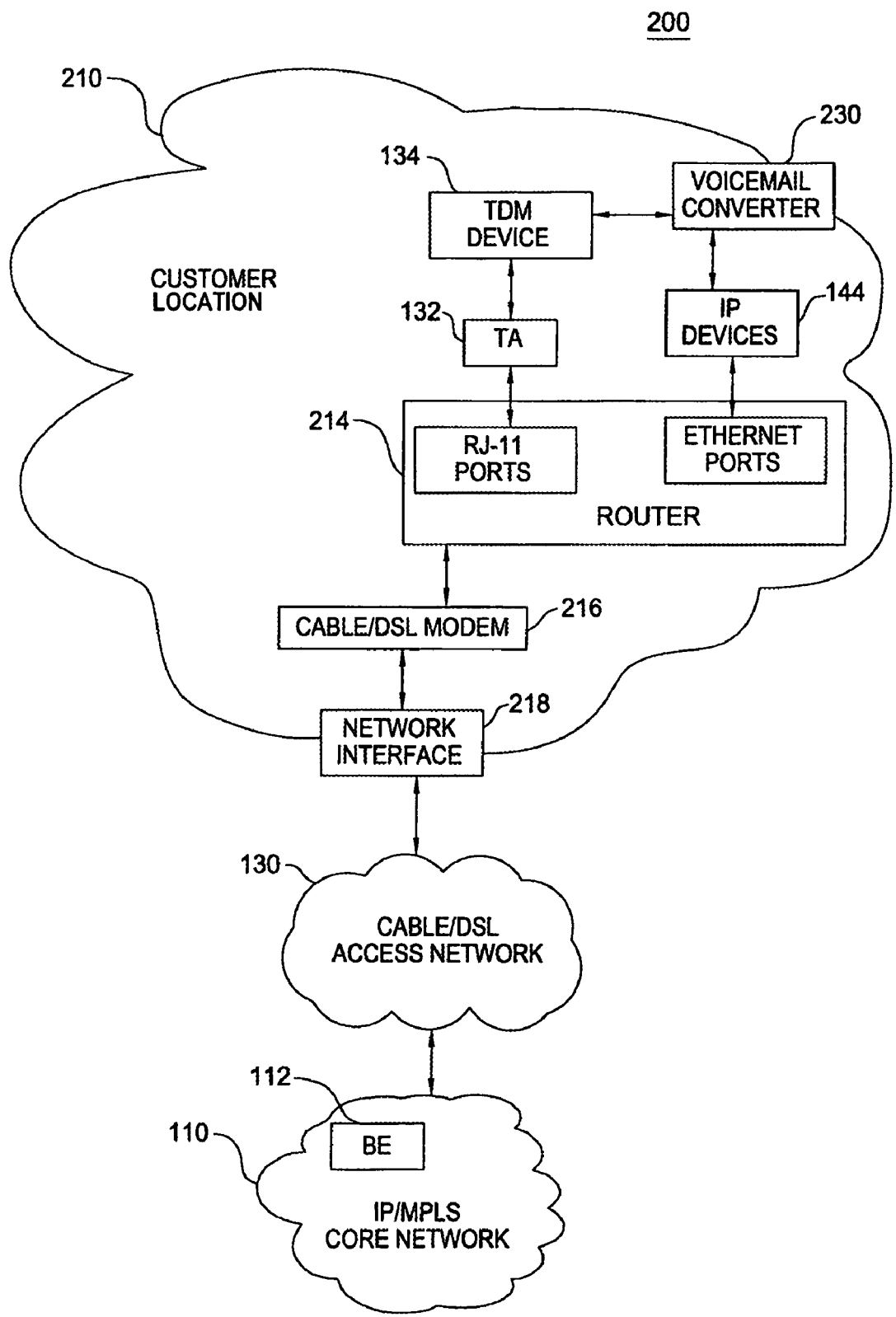
FIG. 2 illustrates an exemplary network with one embodiment of the invention for retrieving voicemail messages via customer premise equipment.

FIG. 2 illustrates an exemplary network 200 with the present invention for playing a plurality of voicemail messages at the same time. For example, the customer location 210 is connected to a broadband access network 130, e.g., a cable or DSL network, via a network interface device 218. In turn, the access network 130 is connected to a core network 110 via a BE 112, where the VoIP or SoIP services are provided by the core network 110, e.g., voicemail services.

In one exemplary embodiment, a coaxial cable is deployed through the residence to connect the network interface device 218 to a cable modem 216. The cable modem 216 separates the CATV channels and the channels used for the data packets. The CATV channels are forwarded to the televisions and/or set-top boxes (not shown). The cable modem then performs the tuner, modulation, demodulation, A/D and D/A conversions for the data and voice packets.

In one exemplary embodiment, the cable modem is connected to a router 214 for the IP based communication. The router 214 manages the sharing of the connection and may also perform various functions such as a firewall function. The endpoint device can be directly attached to the cable modem if there is no need for sharing the connection or for using analog phones. The router 214 can be implemented with various ports, e.g., for Ethernet and RJ-11 connections. The RJ-11 ports are used for connecting a TA 132 for accessing the network with analog (TDM) devices 134. The IP devices 144 may use Ethernet or wireless ports.

In one embodiment, a voicemail converter 230 of the present invention is attached to the devices used to access the emails containing the audio files and/or to the device to be used to play the voicemail messages. For example, the voicemail converter 230 is capable of interacting with the IP device 144, e.g., a computer to retrieve the audio files and then transfers the content to a recording device, e.g., the TDM device 134. For example, the voicemail converter may source an activation signal, e.g., a ring tone, similar to the tone that is generated when calls are received from a TDM network. The TDM device, e.g., an answering machine, answers on behalf of the customer and records one or more messages. In turn, the voicemail converter 230 opens each email and plays the attached audio file. Each voicemail is then recorded in the TDM device 134. The TDM device may be an answering machine, a telephone with a recorder, and the like.

Thus, the voicemail converter refers to a device or module that is used to access emails containing audio files, to retrieve the audio files, and/or to convert the audio files to a format to be stored in another device with capability to play messages at the same time (such as analog based answering machine). For example, a voicemail converter may access emails stored in an email server, click to open each email, click to play attached audio file, and record the message on a memory, a magnetic tape, a hard drive or a compact disc. The storage device may be an answering machine or a TA with capability to record and play messages.

Those skilled in the art would realize the functions performed by the voicemail converter may be implemented in another customer premise equipment such as the computer, the TA, the router, the broadband modem, etc. and may be hardware or software based. The above embodiment is only provided as one implementation and is not intended to limit the present invention. Furthermore, only the network elements needed to describe the present invention are illustrated in FIG. 2. It is not intended to show all the network components or connectivity needed to provide VoIP or SoIP services.

Figure 3:
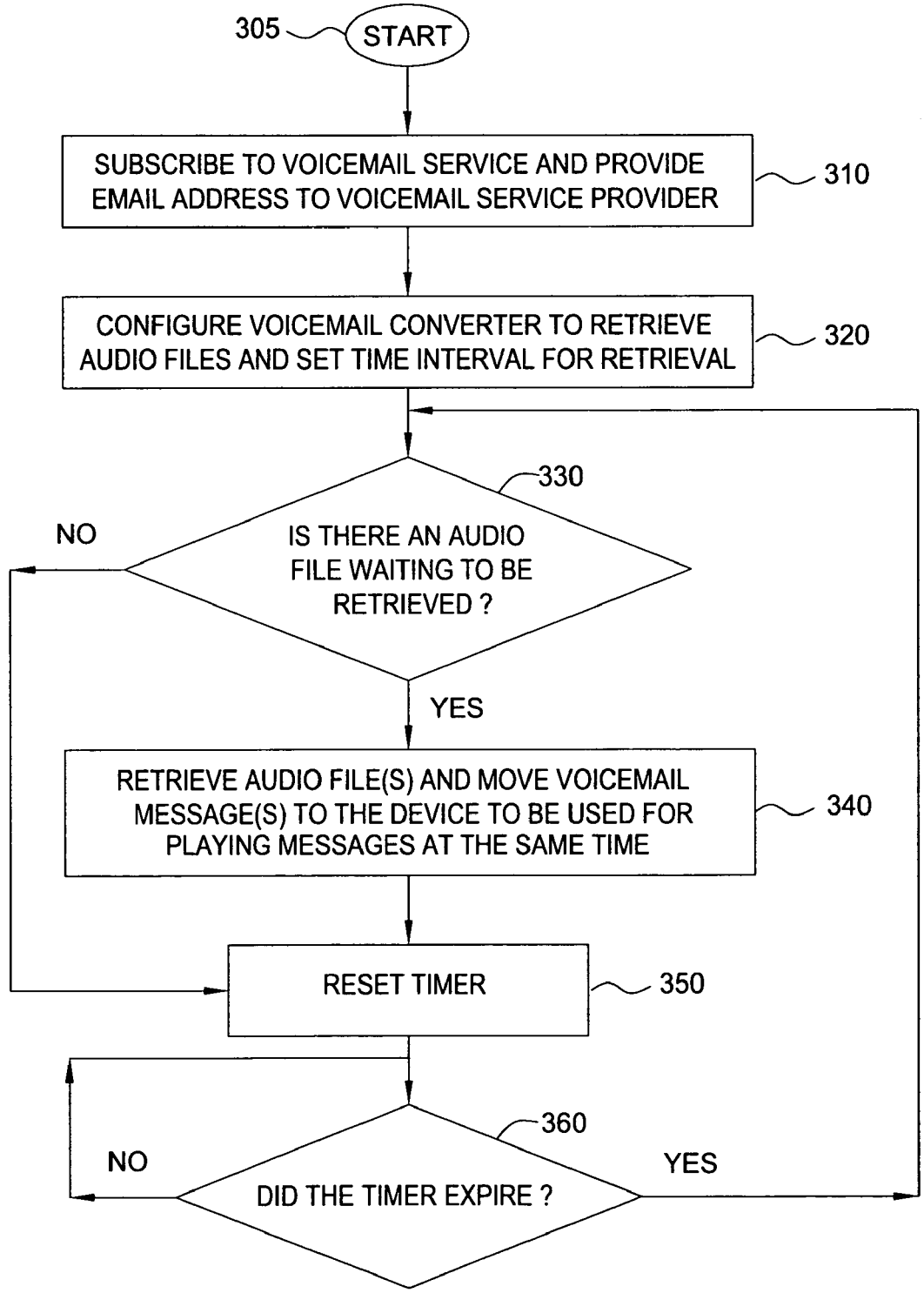
FIG. 3 illustrates a flowchart of the method for retrieving voicemail messages via customer premise equipment.

FIG. 3 illustrates a flowchart of the method 300 for retrieving voicemail messages via customer premise equipment. In one embodiment, the customer installs a voicemail converter in a home or office network. The customer enables the voicemail converter to access email files, to retrieve attached audio files attached to the emails, and/or to record (or transfer) the audio files to a device to be used for playing the retrieved voicemail messages. For example, the customer may connect the voicemail converter between a computer that is used to access emails and to an answering machine that is used for playing the stored messages.

Method 300 starts in step 305 and proceeds to step 310. In step 310, method 300 subscribes a customer or user to a voicemail service provided by a VoIP or SoIP service provider and provides an email address for receiving the audio files. For example, the customer may provide his/her existing email address to the voicemail service provider such that the service provider may send the emails containing the audio files to the existing email address. Note that the email service provider and the voicemail service provider may be the same provider or different providers. For example, the email service may be provided by the broadband access service provider.

In step 320, method 300 configures the voicemail converter of the present invention to retrieve audio files attached to emails and sets a time interval for retrieving. For example, the voicemail converter may be set up to access the email account every 15 minutes, every 30 minutes, every hour, and so on, to retrieve the audio messages. In an alternate embodiment, the voicemail converter is not implemented as a stand-alone unit, but is instead implemented in another customer premise equipment, e.g., within a TA, a computer, a broadband modem, and the like. The method then proceeds to step 330 to determine whether or not there are voicemail messages to retrieve.

In step 330, method 300 determines whether or not there are voicemail messages waiting to be retrieved. For example, the voicemail converter accesses the email server and checks for emails containing audio files. If there are voicemail messages to be retrieved, the method proceeds to step 340. Otherwise, the method proceeds to step 350 to reset the timer.

In step 340, method 300 retrieves voicemail messages and provides the messages to the TDM device to be used for playing all messages at the same time. For example, the voicemail converter plays each audio file and records the messages in another device such as an answering machine as discussed above.

In step 350, method 300 resets the timer. The time interval for checking the messages is selectively configured by the customer. The timer is reset to begin the interval for the next cycle of retrieval. The device may provide multiple options for setting the intervals as well as default values. The interval may also vary depending on time of day, day of week, etc.

In step 360, method 300 determines whether or not the time has expired. If the time has expired, the method proceeds to step 330 to determine whether or not there are audio files waiting to be retrieved, e.g., accessing an email server operated by a voicemail service provider. Otherwise, the method continues on waiting until the time has expired. Note that the customer plays the messages on the TDM device whenever he/she wishes. Hence, the above method continues to transfer the audio files to the device used to play messages regardless of how often the customer plays the messages.

Figure 4:
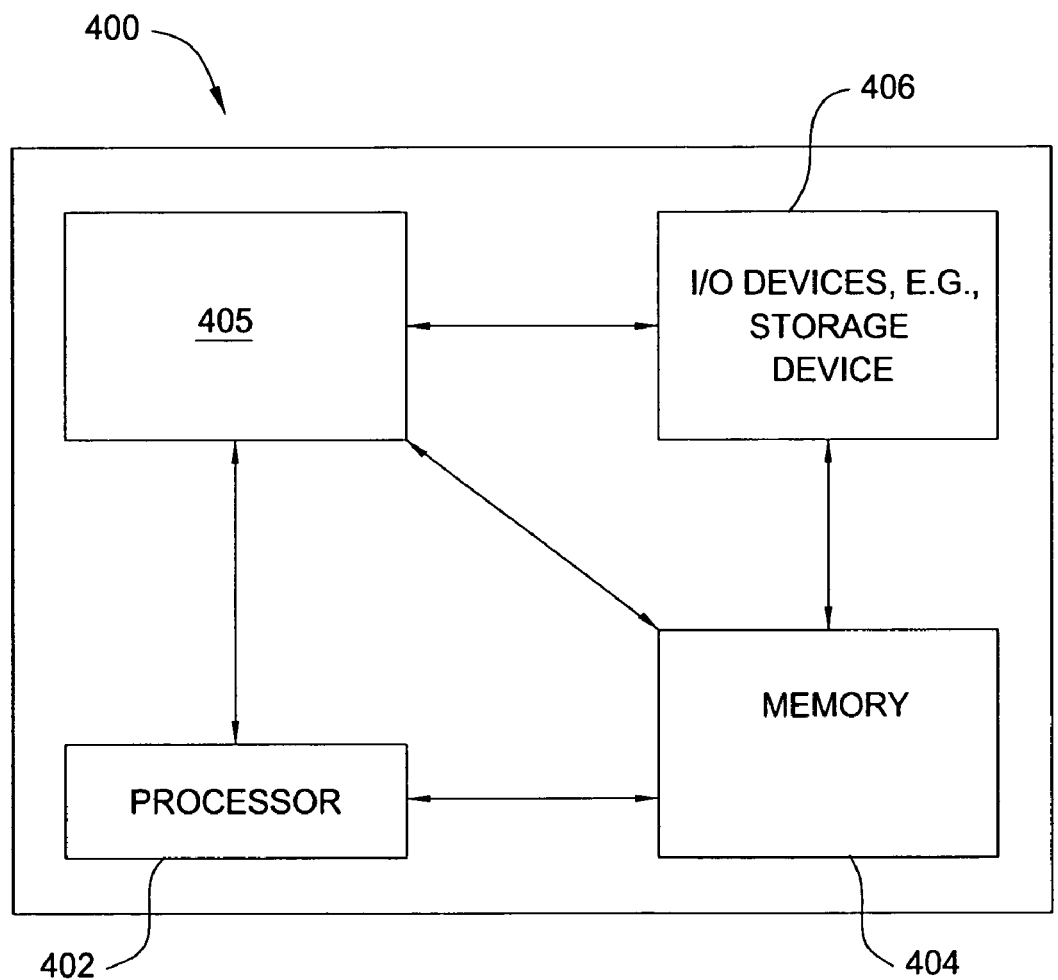
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for retrieving voicemail messages via a customer premise equipment and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general-purpose computer or any other hardware equivalents. In one embodiment, the present module or process 405 for retrieving voicemail messages via a customer premise equipment can be loaded into memory 404 and executed by processor 402 to implement the functions as discussed above. As such, the present method 405 for retrieving voicemail messages via a customer premise equipment (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for retrieving a plurality of voicemail messages from a communication network, comprising:
retrieving a plurality of emails from the communication network by a voicemail converter; extracting, by the voicemail converter, the plurality of voicemail messages from the plurality of emails; and forwarding, by the voicemail converter, the plurality of voicemail messages to an answering machine, where the answering machine allows the plurality of voicemail messages to be played back in a continuous manner, wherein the forwarding comprises: converting the plurality of voicemail messages into a format recognizable by the answering machine, and generating an activation signal to the answering machine, and playing back the plurality of voicemail messages in the continuous manner; wherein the forwarding and the playing back of the plurality of voicemail messages in the continuous manner is responsive to a single user input; and, wherein the voicemail converter is distinct from the answering machine.

2. The method of claim 1, wherein the communication network is an internet protocol network.

3. The method of claim 1, wherein the plurality of voicemail messages is attached to the plurality of emails.

4. The method of claim 1, wherein the plurality of emails is retrieved in accordance with a predefined time interval.

5. A non-transitory computer-readable medium having stored thereon a plurality of instructions, the plurality of instructions including instructions which, when executed by a processor, cause the processor to perform a method for retrieving a plurality of voicemail messages from a communication network, comprising: retrieving, by a voicemail converter, a plurality of emails from the communication network; extracting, by the voicemail converter, the plurality of voicemail messages from the plurality of emails; and forwarding, by the voicemail converter, the plurality of voicemail messages to an answering machine, where the answering machine allows the plurality of voicemail messages to be played back in a continuous manner, wherein the forwarding comprises: converting the plurality of voicemail messages into a format recognizable by the answering machine, and generating an activation signal to the answering machine, and playing back the plurality of voicemail messages in the continuous manner; wherein the forwarding and the playing back of the plurality of voicemail messages in the continuous manner is responsive to a single user input; and, wherein the voicemail converter is distinct from the answering machine.

6. The non-transitory computer-readable medium of claim 5, wherein the communication network is an internet protocol network.

7. The non-transitory computer-readable medium of claim 5, wherein the plurality of voicemail messages is attached to the plurality of emails.

8. The non-transitory computer-readable medium of claim 5, wherein the plurality of emails is retrieved in accordance with a predefined time interval.

9. An apparatus for retrieving a plurality of voicemail messages from a communication network, comprising:
a voicemail converter comprising a processor and a non-transitory computer-readable medium in communication with the processor, the non-transitory computer-readable medium having stored thereon a plurality of instructions, the plurality of instructions including instructions which, when executed by the processor, cause the processor to perform a method comprising:
retrieving a plurality of emails from the communication network;

extracting the plurality of voicemail messages from the plurality of emails; and forwarding the plurality of voicemail messages to an answering machine, where the answering machine allows the plurality of voicemail messages to be played back in a continuous manner, wherein the forwarding comprises: converting the plurality of voicemail messages into a format recognizable by the answering machine, and generating an activation signal to the answering machine, and playing back the plurality of voicemail messages in the continuous manner; wherein the forwarding and the playing back of the plurality of voicemail messages in the continuous manner is responsive to a single user input; and, wherein the voicemail converter is distinct from the answering machine.

10. The apparatus of claim 9, wherein the processor is part of a customer premises equipment.

* * * * *